(12) United States Patent
Gupta et al.

(10) Patent No.: US 10,515,128 B2
(45) Date of Patent: Dec. 24, 2019

(54) METHOD AND SYSTEM FOR DETERMINING A PREFERENCE INDEX

(71) Applicant: MasterCard Asia/Pacific Pte. Ltd., Singapore (SG)

(72) Inventors: Amit Gupta, New Delhi (IN); Geetika Sharma, New Delhi (IN)

(73) Assignee: Mastercard International Incorporated, Purchase, NY (US)

( * ) Notice: Subject to any disclaimer, the term of this patent is extended or adjusted under 35 U.S.C. 154(b) by 357 days.

(21) Appl. No.: 15/160,478

(22) Filed: May 20, 2016

(65) Prior Publication Data

US 2016/0364489 A1 Dec. 15, 2016

(30) Foreign Application Priority Data

Jun. 15, 2015 (SG) .......................... 10201504703Q (51) Int. Cl.
  G06F 17/30 (2006.01)
  G06F 16/9535 (2019.01)
  G06Q 30/02 (2012.01)
(52) U.S. Cl.
  CPC ..... *G06F 16/9535* (2019.01); *G06Q 30/0201* (2013.01)
(58) Field of Classification Search
  USPC ................................................. 707/723, 741
  See application file for complete search history.

(56) References Cited

U.S. PATENT DOCUMENTS

| 9,195,988 B2 * | 11/2015 | Fischer | G06Q 30/0204 |
| 2012/0109751 A1 * | 5/2012 | Binenstock | G06Q 30/0261 705/14.58 |

(Continued)

FOREIGN PATENT DOCUMENTS

| JP | 2001357297 A | 12/2001 |
| JP | 2014-063266 A | 10/2014 |

OTHER PUBLICATIONS

Isobe, Horoshi, "Network Computing", vol. 11, No. 6, Jun. 1, 1999, 7 pp.

(Continued)

*Primary Examiner* — Hung T Vy
(74) *Attorney, Agent, or Firm* — Buckley, Maschoff & Talwalkar LLC (57) ABSTRACT

A system for determining a preference index comprises a transactions database storing transaction data indicative of a plurality of transactions carried out over a payment network, the transaction data comprising, for respective transactions, payment card identifiers, merchant identifiers, merchant category codes, issuer identifiers, payment device types, geographical locations, transaction amounts, transaction times and transaction dates. The system also comprises a transaction indexing component in communication with the transactions database, the transaction indexing component being configured to generate a database query to query the transactions database to retrieve transactions for a plurality of payment cards within a predetermined time window; and a preference index component. The preference index component is configured to compute a paired merchant preference index for a first merchant matching criterion and a second merchant matching criterion by: generating, from at least a subset of the retrieved transactions, a set of payment card identifiers of payment cards which meet both the first merchant matching criterion and the second merchant matching criterion; generating paired data for the first merchant matching criterion and the second merchant matching criterion, the paired data comprising respective pairs of transaction values for respective members of the set of payment card identifiers; and computing at least one aggregate quantity using the paired data.

45 Claims, 6 Drawing Sheets

(56) References Cited

U.S. PATENT DOCUMENTS

2013/0246120 A1\* 9/2013 Chang ................ G06Q 30/0204
  705/7.29
2014/0019352 A1\* 1/2014 Shrivastava ....... G06Q 20/3674
  705/41

OTHER PUBLICATIONS

PCT Search Report and Written Opinion for PCT/SG2016/050264 dated Aug. 23, 2016, 6 pp.

\* cited by examiner

METHOD AND SYSTEM FOR DETERMINING A PREFERENCE INDEX

CROSS-REFERENCE TO RELATED APPLICATION

This application is a U.S. National Stage filing under 35 U.S.C. § 119, based on and claiming benefit of and priority to SG Patent Application No. 10201504703Q filed Jun. 15, 2015.

BACKGROUND

Cashless payment devices of various kinds, such as credit cards, debit cards, and mobile computing devices configured with contactless communication means such as near field communication (NFC) transponders, are commonly used throughout the world of commerce. Typically such payment devices are issued and/or registered with a financial institution (e.g., a bank), called the issuer or issuing institution, to allow the owner of the payment device to transact using funds held with the issuer. The issuer is registered with a payment network over which the transactions are carried out. Merchants at which transactions occur have accounts with banks (or other institutions) which are also registered with the payment network, which in the context of a transaction are termed acquirers or acquirer institutions.

Typically, the issuer of a payment device will offer incentives to customers to choose a particular type of payment device (e.g., credit card). Such incentives may include reward points or other credits which are tied to total spend using the payment device, or spend with particular merchants with which the issuer has agreements. Other incentives may include discounts offered by certain merchants.

It would be desirable to have some insight into the purchasing behaviour of customers, so that the issuer can target merchants to provide offers which are more customer-centric. For example, it would be desirable to reach a better understanding of the behaviour of cardholders by microsegments, so that merchant offers can be targeted at customers in particular microsegment levels. This would assist in encouraging customer "stickiness" and therefore reducing customer attrition.

The present invention seeks to address the above issues.

SUMMARY

A system for determining a preference index comprises:
a transactions database storing transaction data indicative of a plurality of transactions carried out over a payment network, the transaction data comprising, for respective transactions, payment card identifiers, merchant identifiers, merchant category codes, issuer identifiers, payment device types, geographical locations, transaction amounts, transaction times and transaction dates;
a transaction indexing component in communication with the transactions database, the transaction indexing component being configured to generate a database query to query the transactions database to retrieve transactions for a plurality of payment cards within a predetermined time window; and
a preference index component which is configured to compute a paired merchant preference index for a first merchant matching criterion and a second merchant matching criterion by:

generating, from at least a subset of the retrieved transactions, a set of payment card identifiers of payment cards which meet both the first merchant matching criterion and the second merchant matching criterion;
generating paired data for the first merchant matching criterion and the second merchant matching criterion, the paired data comprising respective pairs of transaction values for respective members of the set of payment card identifiers; and
computing at least one aggregate quantity using the paired data.

The paired merchant preference index is indicative of the strength of association between the first merchant matching criterion and the second merchant matching criterion. Thus, for example, if the first and second merchant matching criteria correspond to first and second merchant identifiers, the paired merchant preference index provides an indication of the proclivity of consumers to purchase goods or services from the first and second merchants. A higher value of the index means that consumers are more likely to purchase from both merchants. An issuer institution may select the pairs of merchants which are most strongly associated (i.e., have the highest preference indices) to partner with in order to provide merchant offers to cardholders.

For example, if a pair of merchants has the highest paired merchant preference index, an issuer may provide a credit card product which provides discounts for transactions made at each merchant of that pair, in order to encourage customers to sign up for that product, or to continue to use that product in the event that the discounts had not previously been made available.

In another aspect, a method for determining a preference index comprises:
storing transaction data in a transactions database, the transaction data being indicative of a plurality of transactions carried out over a payment network, the transaction data comprising, for respective transactions, payment card identifiers, merchant identifiers, merchant category codes, issuer identifiers, payment device types, geographical locations, transaction amounts, transaction times and transaction dates;
generating, by a transaction indexing component, a database query to query the transactions database to retrieve transactions for a plurality of payment cards within a predetermined time window; and
computing, by a preference index component, a paired merchant preference index for a first merchant matching criterion and a second merchant matching criterion by:
generating, from at least a subset of the retrieved transactions, a set of payment card identifiers of payment cards which meet both the first merchant matching criterion and the second merchant matching criterion;
generating paired data for the first merchant matching criterion and the second merchant matching criterion, the paired data comprising respective pairs of transaction values for respective members of the set of payment card identifiers; and
computing at least one aggregate quantity using the paired data.

In yet another aspect, a non-transitory computer-readable medium has stored thereon program instructions for causing at least one processor to:
store transaction data in a transactions database, the transaction data being indicative of a plurality of transactions carried out over a payment network, the transaction data comprising, for respective transactions, payment card identifiers, merchant identifiers, merchant category codes, issuer identifiers, payment device types, geographical locations, transaction amounts, transaction times and transaction dates;

generate a database query to query the transactions database to retrieve transactions for a plurality of payment cards within a predetermined time window; and compute a paired merchant preference index for a first merchant matching criterion and a second merchant matching criterion by:

generating, from at least a subset of the retrieved transactions, a set of payment card identifiers of payment cards which meet both the first merchant matching criterion and the second merchant matching criterion;

generating paired data for the first merchant matching criterion and the second merchant matching criterion, the paired data comprising respective pairs of transaction values for respective members of the set of payment card identifiers; and computing at least one aggregate quantity using the paired data.

BRIEF DESCRIPTION OF THE DRAWINGS

Embodiments of the invention will now be described, by way of non-limiting example only, with reference to the accompanying drawings in which.

DETAILED DESCRIPTION OF EMBODIMENTS

As used herein, the term "database" may refer to a body of data, a relational database management system (RDBMS), or both. A database may include any collection of data including hierarchical databases, relational databases, flat file databases, object-relational databases, object oriented databases, and any other structured collection of records or data that is stored in a computer system. The above examples are for illustration only, and are not intended to limit in any way the definition and/or meaning of the term database.

As used herein, the terms "transaction card," "financial transaction card," and "payment card" refer to any suitable cashless payment device, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, transponder devices, NFC-enabled devices, and/or computers. Each type of transaction card can be used as a method of payment for performing a transaction. In addition, consumer card account behaviour can include but is not limited to purchases, management activities (e.g., balance checking), bill payments, achievement of targets (meeting account balance goals, paying bills on time), and/or product registrations (e.g., mobile application downloads).

Figure 1:
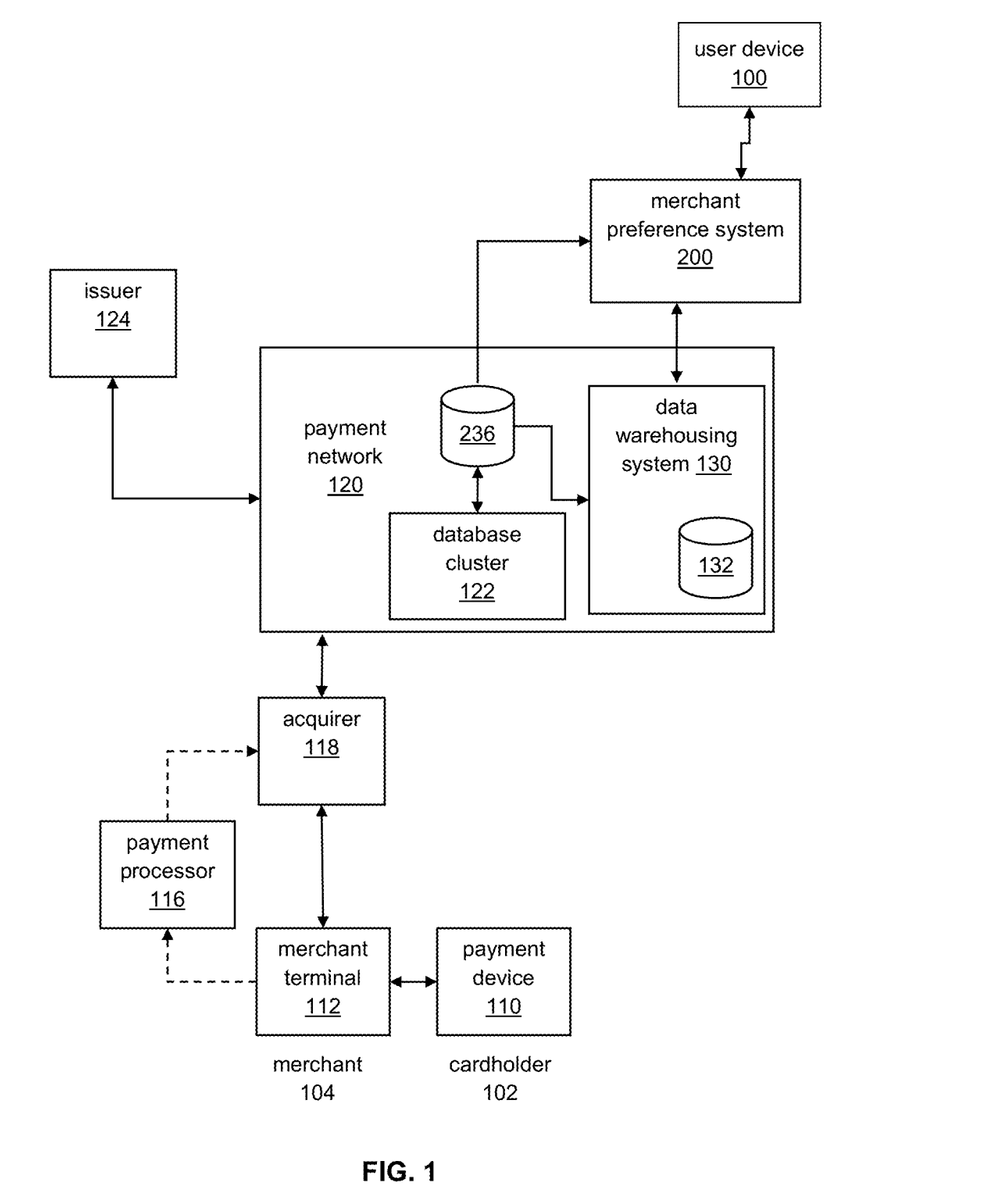
FIG. 1 is a block diagram showing a merchant preference system in communication with a payment network and a user device.

Referring to FIG. 1, a merchant preference system 200 receives, over a communications network, transaction data from a payment network 120, such as the payment networks operated by MasterCard or VISA. The transaction data comprises a plurality of transaction records from transactions made by users of payment devices (referred to herein as cardholders) such as credit cards or debit cards over the payment network 120. The merchant preference system 200 analyses the transaction data to determine one or more merchant preference indices indicative of merchants or combinations of merchants which are preferred by cardholders. The transaction data may be processed in response to a request, for example from a user device 100, and the results of the processing (for example, in the form of the one or more merchant preference indices) may be reported to the user device 100.

The payment network 120 acts as an intermediary during a transaction being made by a cardholder 102 using a payment device 110 at a merchant terminal 112 of a merchant 104. In particular, the cardholder 102 may present payment device 110 to merchant terminal 112 of merchant 104 as payment for goods or services. The merchant terminal 112 may be a point of sale (POS) device such as a magnetic strip reader, chip reader or contactless payment terminal, or a website having online e-commerce capabilities, for example. A merchant 104 may operate one or a plurality of merchant terminals 112. The merchant terminal 112 communicates with an acquirer computer system 118 of a bank or other institution with which the merchant 104 has an established account, in order to request authorisation for the amount of the transaction (sometimes referred to as ticket size) from the acquirer system 118. In some embodiments, if the merchant 104 does not have an account with the acquirer 118, the merchant terminal 112 can be configured to communicate with a third-party payment processor 116 which is authorised by acquirer 118 to perform transaction processing on its behalf, and which does have an account with the acquirer entity.

The acquirer system 118 routes the transaction authorisation request from the merchant terminal 112 to computer systems of the payment network 120. The transaction authorisation request is then routed by payment network 120 to computer systems of the appropriate issuer institution (e.g., issuer 124 or 125) based on information contained in the transaction authorisation request. The issuer institution 124 or 125 is authorised by payment network 120 to issue payment devices 110 on behalf of customers 102 to perform transactions over the payment network 120. Issuer 124 or 125 also provides funding of the transaction to the payment network 120 for transactions that are approved.

The computer systems of issuer 124 or 125 analyse the authorisation request to determine the account number submitted by the payment device 110, and based on the account number, determine whether the account is in good standing and whether the transaction amount is covered by the cardholder's account balance or available credit. Based on this, the transaction can be approved or declined, and an authorisation response message transmitted from issuer 124 or 125 to the payment network 120, which then routes the authorisation response message to the acquirer system 118. Acquirer system 118, in turn, sends the authorisation response message to merchant terminal 112. If the authorisation response message indicates that the transaction is approved, then the account of the merchant 104 (or of the payment processor 116 if appropriate) is credited by the amount of the transaction.

During each authorisation request as described in the previous paragraphs, the payment network 120 stores transaction information in a transactions database 236 accessible via a database cluster 122. The database cluster 122 may comprise one or more physical servers. In some embodiments, the transactions database 236 may be distributed over multiple devices which are in communication with one another over a communications network such as a local-area or wide-area network. In some embodiments, the transactions database 236 may be in communication with a data warehousing system 130 comprising a data warehouse database 132 which may store copies of the transaction data, and/or cleaned and/or aggregated data which are transformed versions of the transaction data. Transaction records (or aggregated data derived therefrom) may be directly accessible for the purposes of performing analyses, for example by payment device association system 200, from transactions database 236. Alternatively, or in addition, the transaction records (or aggregated data derived therefrom) may be accessed (for example, by payment device association system 200) from the data warehouse database 132. Accessing the transaction records from the data warehouse database 132, instead of the transactions database 236, has the advantage that the load on the transactions database 236 is reduced.

The transaction records may comprise a plurality of fields, including an issuer identifier such as an Interbank Card Association (ICA) number; an acquirer identifier/card accepter identifier (the combination of which uniquely defines the merchant); a merchant short name or doing business as (DBA) name; merchant category code (also known as card acceptor business code), that is, an indication of the type of business the merchant is involved in (for example, a gas station); cardholder base currency (i.e., U.S. Dollars, Euros, Yen, etc.); the transaction environment or method being used to conduct the transaction; product specific data such as SKU line item data; the transaction type; card identifier (e.g., card number); transaction time and date; location (full address and/or GPS data); transaction amount (also referred to herein as ticket size); terminal identifier (e.g., merchant terminal identifier or ATM identifier); and response code (also referred to herein as authorization code). Other fields may be present in each transaction record.

Each terminal identifier may be associated with a merchant 104, for example in a merchant database (not shown) of the payment network 120. Typically, a particular merchant 104 will have a plurality of merchant terminal identifiers, corresponding to merchant terminals 112, associated with it.

The user device 100 may be, for example, a mobile phone, a tablet, a laptop, a personal computer, or a personal digital assistant ("PDA"). The user device 100 is arranged to receive information from and output information to a user of the user device 100. The user device 100 comprises a central processing unit ("CPU") or "processing module", a display, a memory for storing data, a network interface, input devices such as a camera and a microphone, and output devices such as speakers, all interconnected by a bus. The display, memory, network interface, camera, microphone and speakers may be integrated into the user device 100. In alternative user devices one or more of the display, memory, network interface, camera, microphone and speakers may not be integrated into the user device 100 and may be connected to the CPU via respective interfaces. One example of such an interface is a USB interface.

User device 100 interacts with merchant preference system 200 via processes executed by the user device 100 which are implemented in the form of programming instructions of one or more software modules or components stored on the memory associated with the user device 100. The software modules or components may comprise a web browser component and/or a special purpose software application for receiving input from the user, transmitting it to the merchant preference system 200, and receiving the results of processing from the merchant preference system 200 and displaying them to the user on the display of user device 100. User device 100 may also have stored, on its memory, a number of standard modules such as an operating system (e.g., iOS or Android).

Figure 2:
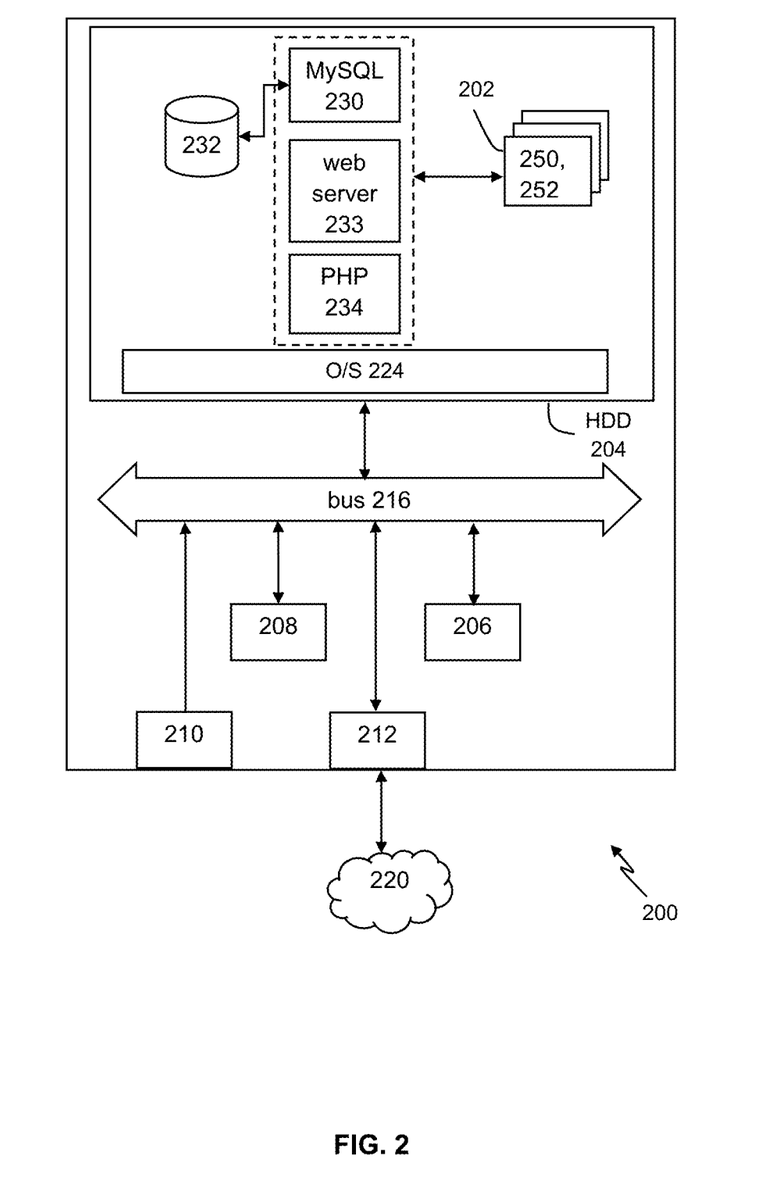
FIG. 2 is a block diagram of the merchant preference system of FIG. 1.

FIG. 2 illustrates an example of a merchant preference system 200. In the described embodiment, the merchant preference system is a standard computer system such as an Intel IA-32 based computer system 200, as shown in FIG. 2, and the associated processes executed by the system 200 are implemented in the form of programming instructions of one or more software modules or components, such as a transaction indexing component 250 and a preference index component 252, stored on tangible and non-volatile (e.g., solid-state or hard disk) storage 204 associated with the computer system 200, as shown in FIG. 2. However, it will be apparent that the processes could alternatively be implemented, either in part or in their entirety, in the form of one or more dedicated hardware components, such as application-specific integrated circuits (ASICs), and/or in the form of configuration data for configurable hardware components such as field programmable gate arrays (FPGAs), for example.

As will be described in more detail later, the transaction indexing component 250 retrieves transaction records from the transactions database 236 or the data warehouse database 232 according to one or more selection criteria. The preference index component 252 analyses the retrieved transaction records to determine one or more merchant preference indices indicative of cardholder preferences for single merchants or combinations of merchants.

Although in the embodiment illustrated in FIG. 2, the transaction indexing component 250 and preference index component 252 are both executed by a single computer system 200, it will be appreciated that in alternative embodiments the merchant preference system 200 may comprise a first computer system executing transaction indexing component 250, and a second computer system executing preference index component 252. In some embodiments the components 250, 252 may execute on different processors or processor cores of a single computer system such as the computer system 200.

As shown in FIG. 2, the system 200 includes standard computer components, including random access memory (RAM) 206, at least one processor 208, and external interfaces 210, 212, all interconnected by a bus 216. The external interfaces may include universal serial bus (USB) interfaces 210, for example, and a network interface connector (NIC) 212 which connects the system 200 to a communications network 220, for example a local area network, or a wide area network such as the Internet.

The system 200 also includes a number of standard software modules, including an operating system 224 such as Linux or Microsoft Windows. The system 200 may include structured query language (SQL) support 230 such as MySQL, available from http://www.mysql.com, which allows data to be stored in and retrieved from an SQL database 232, including output data generated by modules 250, 252. The merchant preference system 200 may also include web server software 233 such as Apache, available at http://www.apache.org, and scripting language support 234 such as PHP, available at http://www.php.net, or Microsoft ASP.

Together, the web server 233, scripting language 234, and SQL modules 230 provide the system 200 with the general ability to allow client computing devices 100 equipped with standard web browser software to access the system 200 and in particular to provide data to and receive data from the database 232.

However, it will be understood by those skilled in the art that the specific functionality provided by the system 200 to such users may be provided by scripts accessible by the web server 233, including the software components 250, 252 implementing the processes described below with reference to FIGS. 4 to 6, and also any other scripts and supporting data, including markup language (e.g., HTML, XML) scripts, PHP (or ASP), and/or CGI scripts, image files, style sheets, and the like.

Figure 4:
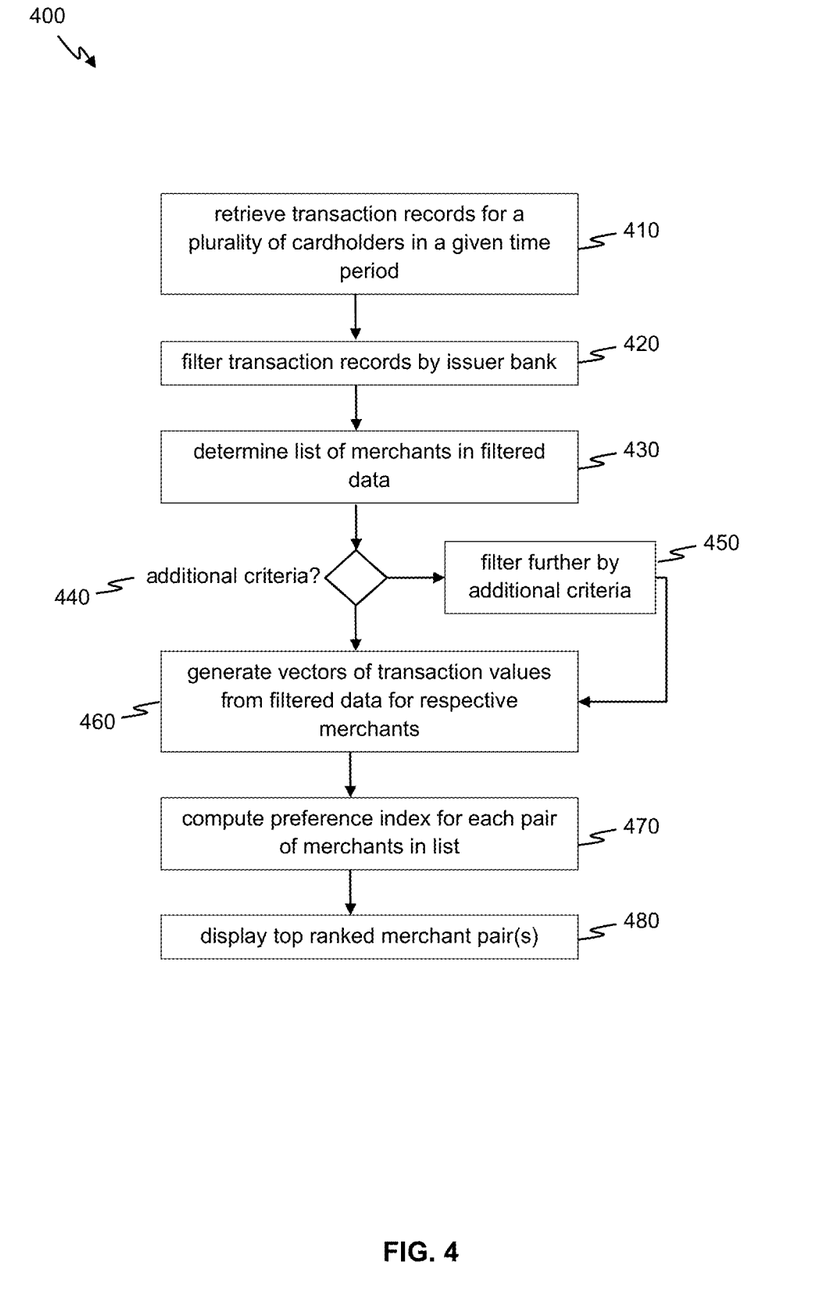
FIG. 4 is a flow diagram of a process for generating a merchant preference index.

Turning now to FIG. 4, there is shown an exemplary process 400 for generating a merchant preference index. In the process 400, a pairwise merchant preference index is calculated for each pair of merchants in transaction records covering a predetermined time period, such as a one-year period or other convenient time window for analysis. In some embodiments, if a merchant has multiple outlets, a pairwise merchant preference index may be calculated for a pair of different outlets of the same merchant.

Figure 3A:
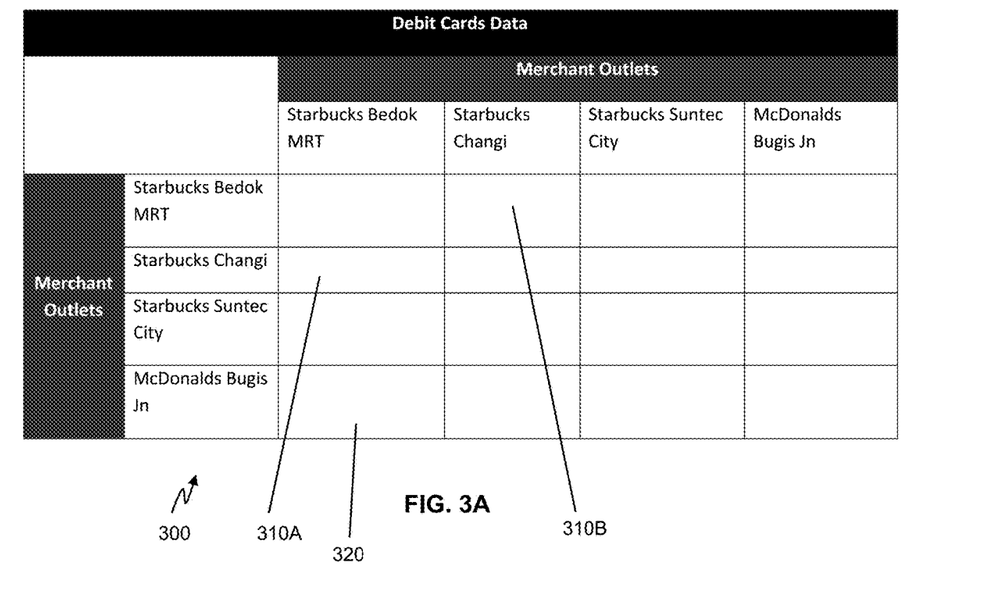
FIG. 3A shows an exemplary output format of a process for generating a merchant preference index.

In some embodiments, the output of the process 400 may be stored in matrix form, as shown in FIG. 3A. Each element of the merchant preference matrix 300 is a single merchant preference index representing a strength of association between the merchants in the pair. For example, element 310A is a pairwise merchant preference index for the pair (Starbucks Bedok MRT, Starbucks Changi) while element 320 is a pairwise merchant preference index for the pair (Starbucks Bedok MRT, McDonalds Bugis Junction). Since the matrix is symmetric, elements on the upper diagonal are identical to their counterparts on the lower diagonal. For example, element 310B has the same value as element 310A. Elements on the diagonal are uninformative and can be ignored. Accordingly, when storing the matrix 300, it is possible to store only the upper diagonal or the lower diagonal elements (for example, in SQL database 232), thus consuming less storage space.

The process 400 calculates merchant preference indices as follows. Firstly, at step 410, the transactions indexing component 250 generates a database query to retrieve, from the transactions database 236 or data warehouse database 132, all transactions occurring within a predetermined time period (such as within a one-year period). The query uses the time and date field of the respective transaction records to select those records which correspond to the desired time period.

The process 400 may be conducted in response to a request (e.g., via a client device 100) from a particular issuer bank. In order to preserve confidential business information of other issuer banks, the transactions indexing component 250 may, at step 420, prepare a reduced (filtered) input data set by only retaining those transaction records corresponding to the issuer bank making the request. Step 420 may therefore comprise matching the ICA number of the issuer bank making the request to the ICA numbers of the respective transaction records, and storing only the matching transaction records as intermediate results in the database 232.

At step 430, the transactions indexing component 250 may generate a list of merchants at which the transactions have taken place. The list of merchants may be in the form of a list of merchant DBA names, such as "Starbucks" (FIG. 3A). Alternatively, the elements of the list may be a combination of merchant DBA name and outlet location, e.g. "Starbucks Suntec City". The merchant DBA name and outlet location may be retrieved from a merchant database (not shown in the Figures) by matching merchant terminal identifiers and/or geographical locations from the transaction records to merchant name and outlet name in the merchant database.

At step 440, the transactions indexing component 250 checks whether any additional filtering criteria, other than time and issuer bank ICA, should be applied to the filtered transaction data. For example, the transactions indexing component 250 may receive user input (e.g., from client device 100 via a web form) indicating that only records for a particular payment device type (debit card, credit card, prepaid card, etc.) are to be analysed. In other embodiments, the analysis may be restricted to a particular time of day, day of the year, or season. Any such additional criteria are used by transactions indexing component 250 at step 450 to successively or simultaneously apply additional filtering to the filtered transaction data (e.g., by querying the intermediate results stored in database 232).

At step 460, the preference index component 252 takes the filtered transaction data as input, and generates, for each merchant in the list of merchants identified at step 430, a vector (or 1-dimensional array) of transaction values. Each component of the vector is a transaction value corresponding to a particular payment device. The transaction value may be a total number or gross dollar value of transactions occurring within the selected time period, for example.

For example, if there are three payment devices and four merchants then the vectors of transaction values for the four merchants may comprise total numbers of transactions as listed in the columns of Table 1 below:

TABLE 1

|  | Starbucks Bedok MRT | Starbucks Changi | Starbucks Suntec City | McDonalds Bugis Junction |
| --- | --- | --- | --- | --- |
| Card 1 | 35 | 11 | 0 | 29 |
| Card 2 | 74 | 2 | 22 | 88 |
| Card 3 | 18 | 0 | 18 | 56 |

That is, the vector of transaction values for Starbucks Bedok MRT across the full set of payment devices is (35, 74, 18).

Next, at step 470, the preference index component 252 uses the vectors of transaction values to compute a pairwise merchant preference index for each pair of merchants in the list. In one example, the preference index component 252 computes an aggregate quantity from the respective vectors of the merchants in the pair, but only for vector components which are non-zero in both vectors. For example, the preference index component 252 may compute a vector aggregate by computing a sum of the two vectors, an average (i.e., component-wise averaging) of the two vectors, or some other component-wise operation on the two vectors. Then, a single preference index may be computed by a further operation on the vector aggregate, such as a sum or average of the components of the vector aggregate, or a standard deviation (or other measure of dispersion). Other methods of computing a pairwise merchant preference index are possible. For example, in some embodiments the preference index component 252 may compute a correlation, such as a rank correlation, between respective vectors of merchants in the pair.

In one particularly advantageous embodiment, the vector aggregate is computed by calculating a component-wise minimum of the two vectors, and then computing a sum (or average, etc.) of the elements of the component-wise minimum vector. For example, in Table 1 above, the component-wise minimum of the vectors for Starbucks Bedok MRT and McDonalds Bugis Junction is (29, 74, 18) and the preference index is the sum of the components, i.e., 29+74+18=121.

The sum (or average, etc.) of the component-wise minimum provides a more robust measure of association (preference index) between the merchants than a simple sum or average. In addition, if the transaction value for a card is zero for either or both of the merchants, then that card will not contribute to the preference index. Accordingly, the use of the component-wise minimum allows for greater computational efficiency, since there is no need to perform an initial filtering step to restrict the vector aggregate calculation to vector components which are non-zero in both vectors.

In another example, the preference index component 252 may determine, as the preference index, the total number of payment devices which have conducted more than a first threshold number of transactions at the first merchant and more than a second threshold number of transactions at the second merchant. The first and second thresholds may be different. The preference index component 252 may determine the threshold for a particular merchant by generating respective distributions of numbers of transactions made by cardholders in the predetermined time period at the merchant, and using, for example and without limitation, the $10^{th}$ percentile, the $25^{th}$ percentile or the median of the distribution as the threshold. The use of transaction number distributions is intended to provide appropriate thresholds for different types of merchant. For example, a merchant which generally has a higher volume of transactions, such as a convenience store or a café, should have a higher threshold than a lower-volume merchant such as an electrical retailer.

In some embodiments, the preference indices calculated at step 470 may be normalized across merchants, e.g. by computing the mean or median preference index across a row or column of the preference index matrix 300, and then dividing all elements of the row or column by the mean or median.

At step 480, the preference index component 252 may examine the elements of the merchant preference matrix 300 (or more particularly, either the upper diagonal or lower diagonal part of the matrix) and rank them to identify those pairs of merchants which have the highest pairwise preference indices. For example, the top 5, top 10 or top 20 pairs of merchants may be identified. Alternatively, all pairs of merchants which exceed some threshold value may be identified. The identified pairs of merchants may be transmitted by preference index component 252 to client device 100 for display to a user, e.g. the issuer bank. This allows the issuer bank to understand which pairs of merchants (and/or merchant outlets) are most closely associated (according to transaction behaviour) by its customers, thereby allowing the issuer bank to target combinations of merchants for customer offers which will help reduce customer attrition.

Figure 5:
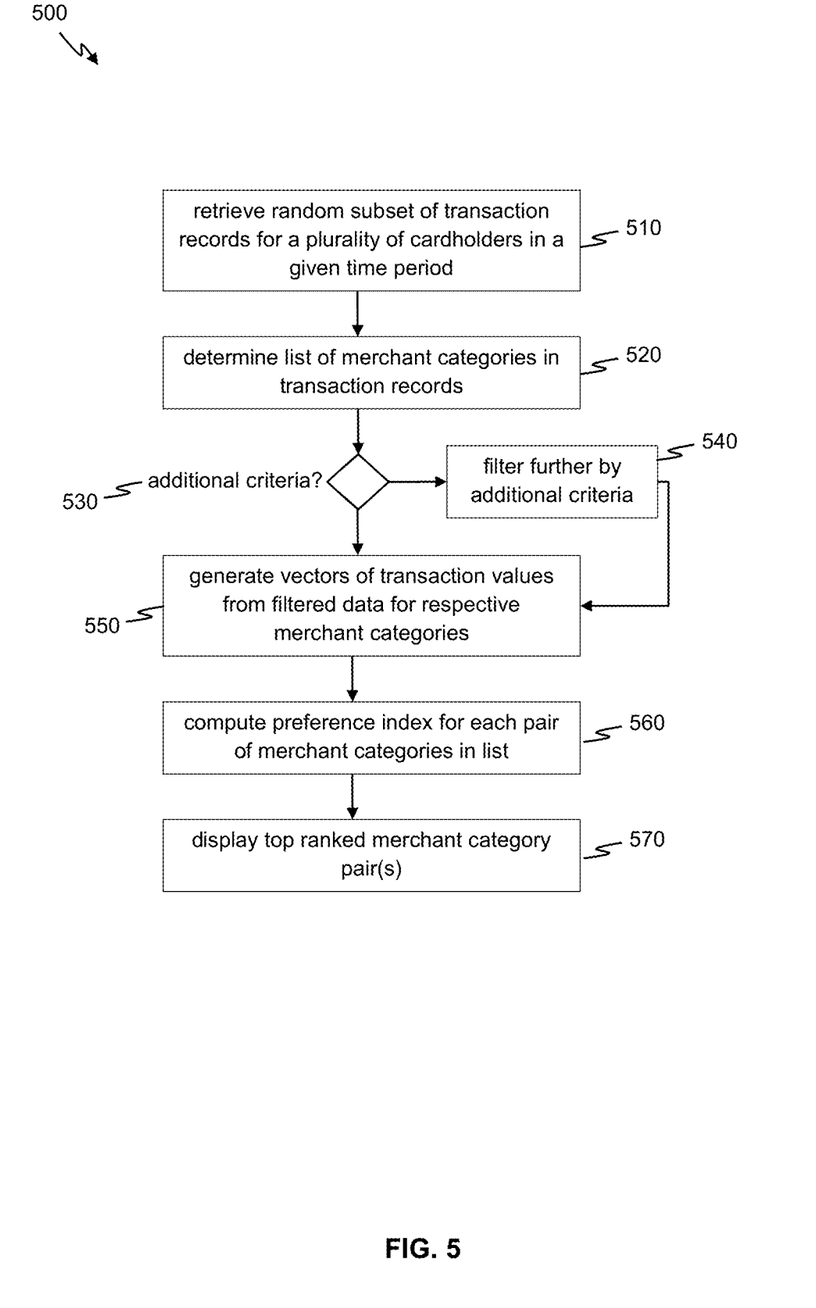
FIG. 5 is a flow diagram of an alternative process for generating a merchant preference index.

In an alternative merchant preference index determination process 500, shown in FIG. 5, the merchant preference system 200 may determine preference indices across all issuer banks, and report them to the requesting issuer bank. In order to preserve confidentiality of business information of the other issuer banks, the analysis performed in process 500 may be restricted to merchant categories, rather than specific merchants, and be restricted to a subset of the data.

In particular, at step 510, the transactions indexing component 250 may retrieve a random subset of the transaction records from the transactions database 236 (or data warehouse database 132) for a predetermined time period (such as a one-year period). The random subset may comprise a random selection of, for example, 10%, 20%, 30%, 40%, 50%, 60%, 70% or 80% of the data.

At step 520, similarly to step 430 of FIG. 4, the transactions indexing component 250 may generate a list of merchant categories at which the transactions have taken place. The list of merchant categories may be determined by the transactions indexing component 250 using the merchant category code (MCC) of the transaction records. For reporting and display purposes, the MCC may be mapped to a merchant category name (e.g. convenience store, gas station, restaurant) using the aforementioned merchant database.

At step 530, the transactions indexing component 250 checks whether any additional filtering criteria, other than time, should be applied to the transaction data. For example, the transactions indexing component 250 may receive user input (e.g., from client device 100 via a web form) indicating that only records for a particular payment device type (debit card, credit card, prepaid card, etc.) are to be analysed. In other embodiments, the analysis may be restricted to a particular time of day, day of the year, or season. Any such additional criteria are used by transactions indexing component 250 at step 540 to successively or simultaneously apply additional filtering to the transaction data to generate filtered transaction data.

At step 550, the preference index component 252 takes the filtered transaction data as input, and generates, for each merchant category in the list of merchant categories identified at step 520, a vector (or 1-dimensional array) of transaction values. Each component of the vector is a transaction value corresponding to a particular payment device. The transaction value may be a total number or gross dollar value of transactions occurring within the selected time period for the merchant category, for example. For example, if three cardholders have made 15, 12 and 17 transactions respectively at restaurants, and 45, 72 and 55 transactions respectively at convenience stores, then the vector for restaurants is (15, 12, 17) and the vector for convenience stores is (45, 72, 55). This may be readily generalized to as many unique cardholders (payment devices) as are present in the filtered transaction data being analysed.

Next, at step 560, the preference index component 252 uses the vectors of transaction values to compute a pairwise merchant category preference index for each pair of merchant categories in the list. As before, the preference index component 252 may compute an aggregate quantity from the respective vectors of the merchant categories in the pair, but only for vector components which are non-zero in both vectors. For example, the preference index component 252 may compute a vector aggregate by computing a sum of the two vectors, an average (i.e., component-wise averaging) of the two vectors, or some other component-wise operation on the two vectors. Then, a single preference index may be computed by a further operation on the vector aggregate, such as a sum or average of the components of the vector aggregate, or a standard deviation (or other measure of dispersion). In some embodiments the preference index component 252 may compute a correlation, such as a rank correlation, between the two vectors.

In one particularly advantageous embodiment, as before, the vector aggregate is computed by calculating a component-wise minimum of the two vectors, and then computing a sum (or average, etc.) of the elements of the component-wise minimum vector.

In another example, the preference index component 252 may determine, as the preference index, the total number of payment devices which have conducted more than a first threshold number of transactions at the first merchant category and more than a second threshold number of transactions at the second merchant category. The first and second thresholds may be different. The preference index component 252 may determine the threshold for a particular merchant category by generating respective distributions of numbers of transactions made by cardholders in the predetermined time period for that merchant category, and using, for example and without limitation, the $10^{th}$ percentile, the $25^{th}$ percentile or the median of the distribution as the threshold.

In some embodiments, the preference indices calculated at step 560 may be normalized across merchant categories. Analogously to the merchant preference index matrix 300 of FIG. 3A, the pairwise merchant category preference indices may be stored in a merchant category preference index matrix, and the mean or median preference index across a row or column of the merchant category preference index matrix may be computed to provide a reference value. All elements of the row or column can then be divided by the reference value.

At step 570, the preference index component 252 may examine the elements of the merchant category preference matrix (or more particularly, either the upper diagonal or lower diagonal part of the matrix) and rank them to identify those pairs of merchant categories which have the highest pairwise preference indices. For example, the top 5, top 10 or top 20 pairs of merchant categories may be identified. Alternatively, all pairs of merchant categories which exceed some threshold value may be identified. The identified pairs of merchant categories may be transmitted by preference index component 252 to client device 100 for display to a user, e.g. the requesting issuer bank.

In some embodiments, the preference index component 252 may report both the highest ranked pairwise merchant preference indices and the highest ranked pairwise merchant category preference indices, for example by transmitting them to client device 100.

Figure 6:
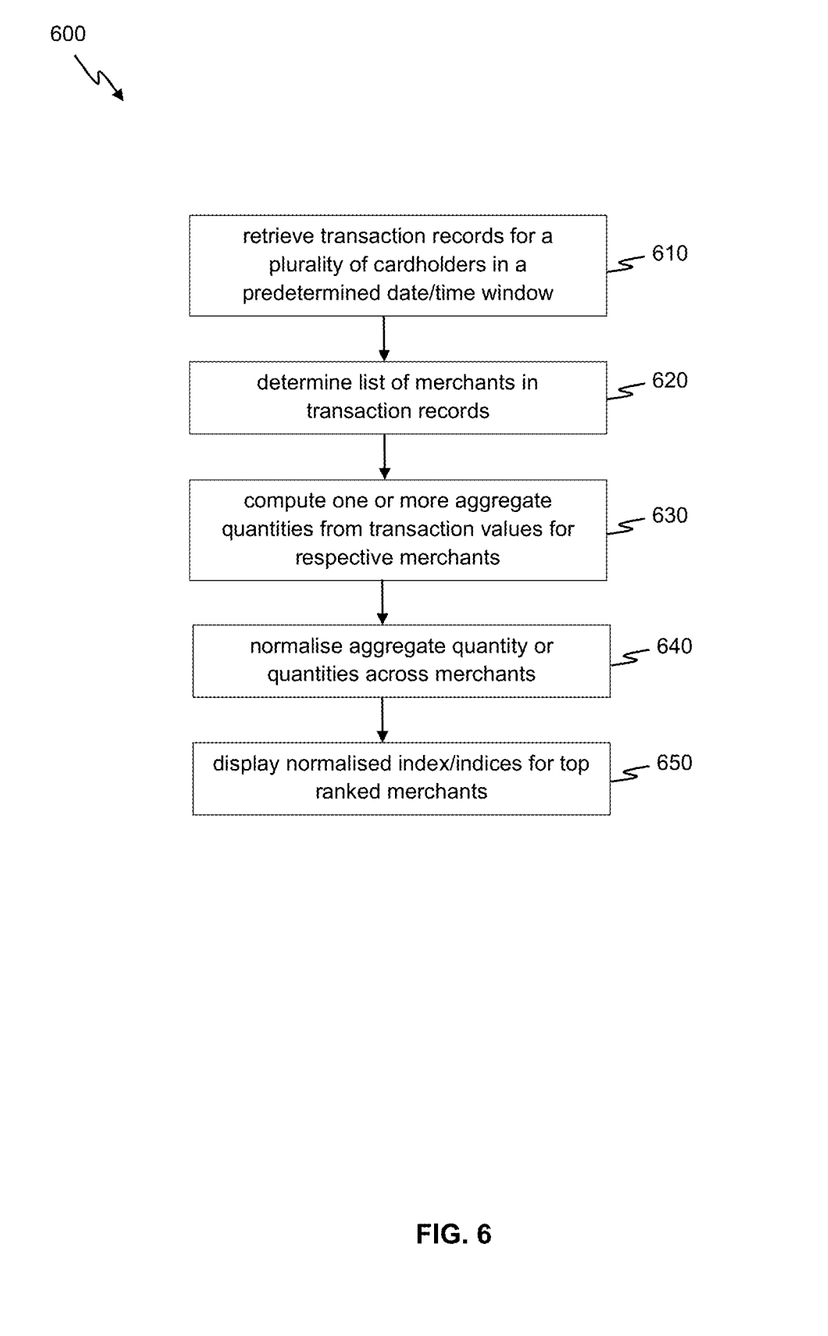
FIG. 6 is a flow diagram of a further alternative process for generating a merchant preference index.

FIG. 6 shows another embodiment of a process 600 for determining a merchant preference index. At step 610, the transactions indexing component 250 retrieves transaction records for a predetermined time period, as before. If individual merchants are to be analysed then the data may be restricted to transactions corresponding to the requesting issuer bank, as before.

Step 610 additionally comprises the transactions indexing component 250 grouping the transaction records according to one or more time-based criteria. For example, the time-based criteria may include time of day (e.g., in 3-hour blocks or some other convenient division of the 24 hours of a day), and day of year. The transaction records may instead, or as well, be grouped according to one or more non-time-based criteria, such as payment device type (e.g., debit card, credit card, prepaid card).

At step 620, the transactions indexing component 250 determines a list of merchants and/or a list of merchant outlets in the retrieved (and possibly filtered) transaction records. Then, at step 630, the preference index component 252 computes one or more aggregate quantities from transaction values derived from the transaction records within each group generated at step 610. For example, the preference index component 252 may compute the total number of transactions within a group, and/or the total number of payment devices corresponding to transactions within the group, and/or the gross dollar value of transactions within the group.

At step 640, the preference index component 252 may normalize the one or more aggregate quantities across merchants or merchant outlets. For example, the preference index component 252 may compute a reference value such as an average or median across merchants for the aggregate quantity (e.g., the average number of transactions across merchants), and divide each of the individual merchant aggregate values by the reference value to obtain a relative measure of customer preference for each group.

Figure 3B:
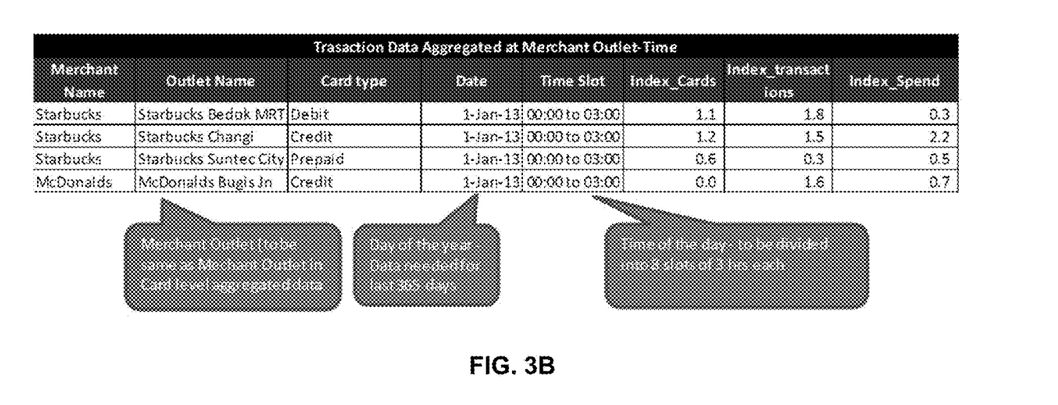
FIG. 3B shows an exemplary output format of another process for generating a merchant preference index.

For example, as shown in the table of FIG. 3B, the preference index for Starbucks Bedok MRT on 1 Jan. 2013 in the midnight to 3AM time slot for the total number of transactions is 1.8. This indicates that for this time slot, there are 1.8 times as many total transactions carried out at Starbucks Bedok MRT than the average merchant outlet. On the other hand, the preference index for the same time slot and outlet for gross dollar value (spend) is 0.3, indicating that the total spend for this time slot is 0.3 times the spend of the average merchant outlet.

At step 650 the preference index component may transmit, to client device 100 for example, the normalized indices for the list of merchants identified at step 620. This may be displayed in tabular form as shown in FIG. 3B. In some embodiments the table of normalized indices may be displayed in addition to the top-ranked pairwise merchant and merchant category indices generated by processes 400 and 500.

As used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable medium embedded with a computer executable program, which encompasses a computer program accessible from any computer-readable storage device or storage media. For example, computer readable media can include but are not limited to magnetic storage devices (e.g., hard disk, floppy disk, magnetic strips . . .), optical disks (e.g., compact disk (CD), digital versatile disk (DVD) . . .), smart cards, and flash memory devices (e.g., card, stick, key drive . . .). Of course, those skilled in the art will recognize many modifications may be made to this configuration without departing from the scope or spirit of the claimed subject matter.

The invention claimed is:

1. A system for determining a pairwise merchant preference index, comprising:
   a transactions database storing transaction data indicative of a plurality of transactions carried out over a payment network, the transaction data comprising, for respective transactions, payment card identifiers, merchant identifiers, merchant category codes, issuer identifiers, payment device types, geographical locations, transaction amounts, transaction times and transaction dates;
   a transaction indexing component in communication with the transactions database, the transaction indexing component being configured to generate a database query to query the transactions database to retrieve transactions for a plurality of payment cards that occurred within a predetermined time window;
   a preference index component which is configured to compute a pairwise merchant preference index comprising identified pairs of merchants for a first merchant matching criterion and a second merchant matching criterion by:
      generating, from at least a subset of the retrieved transactions, a set of payment card identifiers of payment cards which meet both the first merchant matching criterion and the second merchant matching criterion;
      generating paired data for the first merchant matching criterion and the second merchant matching criterion, the paired data comprising respective pairs of transaction values for respective members of the set of payment card identifiers; and
      computing at least one aggregate quantity using the paired data; and
   a client device in communication with the preference index component, the client device configured for receiving and displaying the identified pairs of merchants of the pairwise merchant preference index to an issuer bank allowing the issuer bank to target combinations of merchants for customer offers.

2. A system according to claim 1, wherein the first merchant matching criterion corresponds to a merchant identifier or a merchant category code.

3. A system according to claim 1, wherein the second merchant matching criterion corresponds to a merchant identifier or a merchant category code.

4. A system according to claim 1, wherein at least one aggregate quantity comprises a sum or average over respective minima of the pairs of transaction values.

5. A system according to claim 1, wherein the transaction values are total numbers of transactions within the predetermined time window.

6. A system according to claim 1, wherein the preference index component is configured to compute a plurality of paired merchant preference indices for the first merchant matching criterion and a plurality of second merchant matching criteria, by:
   generating, from the retrieved transactions, a plurality of sets of payment card identifiers of payment cards which meet both the first merchant matching criterion and respective ones of the plurality of second merchant matching criteria;
   generating a plurality of sets of paired data, each set of paired data comprising respective pairs of transaction values for the first merchant matching criterion and the respective second merchant matching criterion, for respective members of the set of payment card identifiers; and
   computing respective aggregate quantities using the respective sets of paired data.

7. A system according to claim 6, wherein the preference index component is configured to normalize the paired merchant preference indices according to a reference value.

8. A system according to claim 7, wherein the reference value is an average of the paired merchant reference indices.

9. A system according to claim 1, wherein the preference index component is configured to generate a filtered set of the paired data by filtering out pairs of transaction values which are below respective first and second transaction number thresholds, and to compute the at least one aggregate quantity using the filtered set of paired data.

10. A system according to claim 9, wherein at least one aggregate quantity comprises a total number of pairs in the filtered set.

11. A system according to claim 9, wherein the preference index component is configured to determine the first transaction number threshold using a distribution of transaction numbers for payment cards meeting the first merchant matching criterion, and to determine the second transaction number threshold using a distribution of transaction numbers for payment cards meeting the second merchant matching criterion.

12. A system according to claim 1, wherein the transaction indexing component is configured to modify the database query by appending at least one additional criterion.

13. A system according to claim 12, wherein the at least one additional criterion is based on one or more of an issuer identifier, a payment device type, a geographical region, a transaction time range, and one or more transaction dates.

14. A system according to claim 1, wherein the transaction indexing component is configured to retrieve a random subset of the transactions within the predetermined time window.

15. A system according to claim 14, wherein the random subset comprises a random selection of 80% or less of the transactions within the predetermined time window.

16. A method for determining a pairwise merchant preference index, comprising:
   storing transaction data in a transactions database, the transaction data being indicative of a plurality of transactions carried out over a payment network, the transaction data comprising, for respective transactions, payment card identifiers, merchant identifiers, merchant category codes, issuer identifiers, payment device types, geographical locations, transaction amounts, transaction times and transaction dates;
   generating, by a transaction indexing component, a database query to query the transactions database to retrieve transactions for a plurality of payment cards that occurred within a predetermined time window;
   computing, by a preference index component, a pairwise merchant preference index comprising identified pairs of merchants for a first merchant matching criterion and a second merchant matching criterion by:
      generating, from at least a subset of the retrieved transactions, a set of payment card identifiers of payment cards which meet both the first merchant matching criterion and the second merchant matching criterion;
      generating paired data for the first merchant matching criterion and the second merchant matching criterion, the paired data comprising respective pairs of transaction values for respective members of the set of payment card identifiers; and computing at least one aggregate quantity using the paired data; and transmitting, by the preference index component, the identified pairs of merchants of the pairwise merchant preference index to a client device for display to an issuer bank allowing the issuer bank to target combinations of merchants for customer offers.

17. A method according to claim 16, wherein the first merchant matching criterion corresponds to a merchant identifier or a merchant category code.

18. A method according to claim 16, wherein the second merchant matching criterion corresponds to a merchant identifier or a merchant category code.

19. A method according to claim 16, wherein at least one aggregate quantity comprises a sum or average over respective minima of the pairs of transaction values.

20. A method according to claim 16, wherein the transaction values are total numbers of transactions within the predetermined time window.

21. A method according to claim 16, comprising computing, by the preference index component, a plurality of paired merchant preference indices for the first merchant matching criterion and a plurality of second merchant matching criteria, by:

generating, from the retrieved transactions, a plurality of sets of payment card identifiers of payment cards which meet both the first merchant matching criterion and respective ones of the plurality of second merchant matching criteria;

generating a plurality of sets of paired data, each set of paired data comprising respective pairs of transaction values for the first merchant matching criterion and the respective second merchant matching criterion, for respective members of the set of payment card identifiers; and computing respective aggregate quantities using the respective sets of paired data.

22. A method according to claim 21, comprising normalizing the paired merchant preference indices according to a reference value.

23. A method according to claim 22, wherein the reference value is an average of the paired merchant reference indices.

24. A method according to claim 16, comprising generating, by the transaction indexing component, a filtered set of the paired data by filtering out pairs of transaction values which are below respective first and second transaction number thresholds, and computing the at least one aggregate quantity using the filtered set of paired data.

25. A method according to claim 24, wherein at least one aggregate quantity comprises a total number of pairs in the filtered set.

26. A method according to claim 24, comprising determining, by the preference index component, the first transaction number threshold using a distribution of transaction numbers for payment cards meeting the first merchant matching criterion, and determining the second transaction number threshold using a distribution of transaction numbers for payment cards meeting the second merchant matching criterion.

27. A method according to claim 16, comprising modifying, by the transaction indexing component, the database query by appending at least one additional criterion.

28. A method according to claim 27, wherein the at least one additional criterion is based on one or more of an issuer identifier, a payment device type, a geographical region, a transaction time range, and one or more transaction dates.

29. A method according to claim 16, comprising retrieving, by the transaction indexing component, a random subset of the transactions within the predetermined time window.

30. A method according to claim 29, wherein the random subset comprises a random selection of 80% or less of the transactions within the predetermined time window.

31. A non-transitory computer-readable medium having stored thereon program instructions for causing at least one processor to:

store transaction data in a transactions database, the transaction data being indicative of a plurality of transactions carried out over a payment network, the transaction data comprising, for respective transactions, payment card identifiers, merchant identifiers, merchant category codes, issuer identifiers, payment device types, geographical locations, transaction amounts, transaction times and transaction dates;

generate a database query to query the transactions database to retrieve transactions for a plurality of payment cards that occurred within a predetermined time window;

compute a pairwise merchant preference index comprising identified pairs of merchants for a first merchant matching criterion and a second merchant matching criterion by:

generating, from at least a subset of the retrieved transactions, a set of payment card identifiers of payment cards which meet both the first merchant matching criterion and the second merchant matching criterion;

generating paired data for the first merchant matching criterion and the second merchant matching criterion, the paired data comprising respective pairs of transaction values for respective members of the set of payment card identifiers;

computing at least one aggregate quantity using the paired data; and transmit the identified pairs of merchants of the pairwise merchant preference index to a client device for display to an issuer bank allowing the issuer bank to target combinations of merchants for customer offers.

32. A non-transitory computer-readable medium according to claim 31, wherein the first merchant matching criterion corresponds to a merchant identifier or a merchant category code.

33. A non-transitory computer-readable medium according to claim 31, wherein the second merchant matching criterion corresponds to a merchant identifier or a merchant category code.

34. A non-transitory computer-readable medium according to claim 31, wherein at least one aggregate quantity comprises a sum or average over respective minima of the pairs of transaction values.

35. A non-transitory computer-readable medium according to claim 31, wherein the transaction values are total numbers of transactions within the predetermined time window.

36. A non-transitory computer-readable medium according to claim 31, wherein the program instructions cause the at least one processor to compute a plurality of paired merchant preference indices for the first merchant matching criterion and a plurality of second merchant matching criteria, by:

generating, from the retrieved transactions, a plurality of sets of payment card identifiers of payment cards which meet both the first merchant matching criterion and respective ones of the plurality of second merchant matching criteria;

generating a plurality of sets of paired data, each set of paired data comprising respective pairs of transaction values for the first merchant matching criterion and the respective second merchant matching criterion, for respective members of the set of payment card identifiers; and computing respective aggregate quantities using the respective sets of paired data.

37. A non-transitory computer-readable medium according to claim 36, wherein the program instructions further cause the at least one processor to normalize the paired merchant preference indices according to a reference value.

38. A non-transitory computer-readable medium according to claim 37, wherein the reference value is an average of the paired merchant reference indices.

39. A non-transitory computer-readable medium according to claim 31, wherein the program instructions further cause the at least one processor to generate a filtered set of the paired data by filtering out pairs of transaction values which are below respective first and second transaction number thresholds, and to compute the at least one aggregate quantity using the filtered set of paired data.

40. A non-transitory computer-readable medium according to claim 39, wherein at least one aggregate quantity comprises a total number of pairs in the filtered set.

41. A non-transitory computer-readable medium according to claim 39, wherein the program instructions further cause the at least one processor to determine the first transaction number threshold using a distribution of transaction numbers for payment cards meeting the first merchant matching criterion, and to determine the second transaction number threshold using a distribution of transaction numbers for payment cards meeting the second merchant matching criterion.

42. A non-transitory computer-readable medium according to claim 31, wherein the program instructions further cause the at least one processor to modify the database query by appending at least one additional criterion.

43. A non-transitory computer-readable medium according to claim 42, wherein the at least one additional criterion is based on one or more of an issuer identifier, a payment device type, a geographical region, a transaction time range, and one or more transaction dates.

44. A non-transitory computer-readable medium according to claim 31, wherein the program instructions further cause the at least one processor to retrieve a random subset of the transactions within the predetermined time window.

45. A non-transitory computer-readable medium according to claim 44, wherein the random subset comprises a random selection of 80% or less of the transactions within the predetermined time window.

* * * * *